No. 620,351. Patented Feb. 28, 1899.
G. B. McMERRICK.
HOISTING HOOK.
(Application filed Dec. 20, 1898.)
(No Model.)
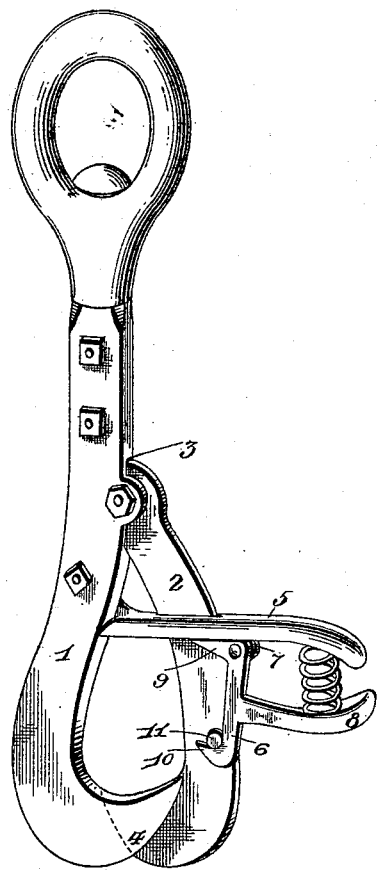
Witnesses
Thomas Clay Perkins
J. L. Wilson
Inventor
George B. McMerrick,
by H. B. Willson & Co
Attorneys

UNITED STATES PATENT OFFICE.

GEORGE B. McMERRICK, OF CARTHAGE, MISSOURI.

HOISTING-HOOK.

SPECIFICATION forming part of Letters Patent No. 620,351, dated February 28, 1899.

Application filed December 20, 1898. Serial No. 699,804. (No model.)

*To all whom it may concern:*

Be it known that I, GEORGE B. MCMERRICK, a citizen of the United States, residing at Carthage, in the county of Jasper and State of Missouri, have invented certain new and useful Improvements in Hoisting-Hooks; and I do declare the following to be a full, clear, and exact description of the invention, such as will enable others skilled in the art to which it appertains to make and use the same.

The invention relates to hoisting-hooks, and more particularly to that class of inventions used in mines for attaching the tubs or buckets to hoisting-cables.

The objects of the invention are to provide a safety-hook, one that shall be simple in construction, durable in use, and comparatively inexpensive of production, and one in which the chances of its becoming accidentally disengaged from the bail of the tub or bucket will be reduced to a minimum, or rendering it next to impossible for the tub or bucket to become accidentally detached and fall with its load of human lives to the bottom of the shaft, which is a common occurrence in mining districts and annually results in great loss of life.

With these objects in view the invention consists in certain features of construction and combination of parts, which will be hereinafter fully described, and particularly pointed out in the appended claim.

In the accompanying drawing I have illustrated my invention in perspective, the hook being shown closed and locked.

In the drawing, 1 and 2 denote the members forming the hook. The member 1 is provided with a slot 3 to receive the upper end of the member 2, which is pivoted therein. The member 1 is also provided with a ring which may be fixed or swiveled. The lower ends of these members when brought together lap, thus adding strength to the hook where the bail of the tub is supported, and are beveled, as shown at 4, so that when unlocked and the hook brought into engagement with the bail the members will separate to allow the bail to pass in between them.

5 denotes a locking-lever pivoted to the member 1 and straddling the member 2. When the members of the hook are closed, by depressing the lever 5 it will lock the members against separation at their lower ends. This locking-lever, however, may be accidentally knocked from its position and thus permit the members of the hook to separate, and to overcome this objection I provide the latch 6, and will now proceed to describe its construction and operation. This latch is pivoted to the ear 7, projecting downwardly from the lever, and has toes 9 extending on opposite sides of the member 2 and serving to limit the inward movement of the lower end of the latch. The latch is provided with a handle 8, between which and the free end of the lever is confined a coil-spring 9, the force of which is exerted to depress the handle and throw the bill 10 of the latch under the stud 11, projecting from the member 2 of the hook. The lower side of the bill is preferably beveled, so that when the locking-lever is forced downward to lock the members of the hook together the beveled face of the bill of the latch will ride over the stud, and as soon as it passes it will be forced inward under the stud by the coil-spring, thus securing the locking-lever against upward movement, and thereby effectually preventing the separation of the hook members. The toe of the latch abuts the under side of the locking-lever and prevents the coil-spring throwing the lower end of the latch too far inward, which would prevent it engaging the stud when the parts were desired to be locked. As constructed it will be seen that by pressing downward upon the locking-lever it will lock the hook members together and at the same time throw the latch into engagement with the stud and lock itself against upward movement.

It will of course be understood that various changes in the form, proportion, and the minor details of construction may be resorted to without departing from the spirit or sacrificing any of the advantages of this invention.

Having thus described the invention, what I claim, and desire to secure by Letters Patent, is—

The combination with a hook consisting of two pivoted members, a locking-lever pivoted to one member and embracing the other member, a stud projecting from one of said members, a latch pivoted to the locking-lever and provided with toes to engage the under side thereof, and with a bill to engage the stud, said latch being provided with a handle, and a coil-spring confined between the handle of the latch and the free end of the operating-lever, substantially as set forth.

In testimony whereof I have hereunto set my hand in presence of two subscribing witnesses.

GEO. B. McMERRICK.

Witnesses:
M. J. HUTTON,
JULIUS DEMERE.